United States Patent
Matono

(10) Patent No.: US 7,248,436 B2
(45) Date of Patent: Jul. 24, 2007

(54) THIN FILM MAGNETIC HEAD AND METHOD OF MANUFACTURING THE SAME

(75) Inventor: Naoto Matono, Saku (JP)

(73) Assignee: SAE Magnetics (H.K.), Ltd., Shatin, N.T. (HK)

( * ) Notice: Subject to any disclaimer, the term of this patent is extended or adjusted under 35 U.S.C. 154(b) by 0 days.

(21) Appl. No.: 10/873,273

(22) Filed: Jun. 23, 2004

(65) Prior Publication Data

US 2004/0233579 A1  Nov. 25, 2004

Related U.S. Application Data

(63) Continuation of application No. 09/990,490, filed on Nov. 15, 2001, now abandoned.

(30) Foreign Application Priority Data

Nov. 22, 2000  (JP)  ............................. 2000-356397

(51) Int. Cl.
G01B 5/31 (2006.01)
G01B 5/39 (2006.01)
(52) U.S. Cl. .................... 360/126; 360/317; 29/603.15
(58) Field of Classification Search ................ 360/317, 360/125, 126; 29/603.15, 603.16
See application file for complete search history.

(56) References Cited

U.S. PATENT DOCUMENTS

| | | | | |
|---|---|---|---|---|
| 5,438,747 A | * | 8/1995 | Krounbi et al. | .......... 29/603.16 |
| 5,793,578 A | * | 8/1998 | Heim et al. | .................. 360/126 |
| 6,154,346 A | * | 11/2000 | Sasaki | .................. 360/317 |
| 6,156,375 A | * | 12/2000 | Hu et al. | ..................... 427/116 |
| 6,266,868 B1 | * | 7/2001 | Sasaki | ........................ 29/603.1 |
| 6,404,602 B2 | * | 6/2002 | Sasaki | ........................ 360/317 |
| 6,651,312 B1 | * | 11/2003 | Sasaki | ..................... 29/603.12 |
| 6,729,012 B1 | * | 5/2004 | Sasaki | ..................... 29/603.07 |
| 2001/0009491 A1 | * | 7/2001 | Sasaki | ........................ 360/318 |
| 2002/0026705 A1 | * | 3/2002 | Santini | .................... 29/603.12 |
| 2002/0067570 A1 | * | 6/2002 | Sasaki et al. | ............... 360/126 |
| 2003/0193743 A1 | * | 10/2003 | Sasaki et al. | ............... 360/126 |

* cited by examiner

Primary Examiner—William J Klimowicz
(74) Attorney, Agent, or Firm—Kenyon & Kenyon LLP

(57) ABSTRACT

Provided are a thin film magnetic head and a method of manufacturing the same, which can locally miniaturized a pole width with high accuracy. A thin film coil is provided in a region located more rearward than a position (a first position) of a rear end of a top shield layer. A position of a surface of an underlayer of a rearward region of a write gap layer, i.e., the region in which the thin film coil is to be formed is lower than a position of a surface of an underlayer of a frontward region. Thus, a height (μm) of an apex portion formed of an insulating film decreases. Thus, a top pole can be formed so that a tip portion has a local miniature uniform width. Therefore, the pole width can be locally miniaturized with high accuracy.

10 Claims, 16 Drawing Sheets

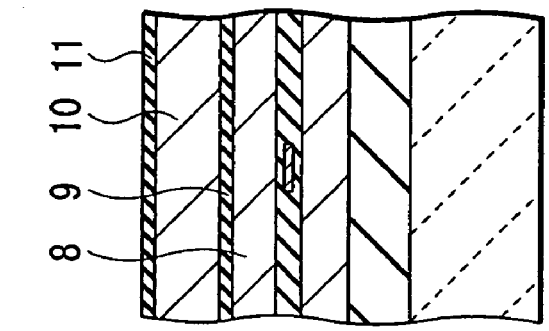
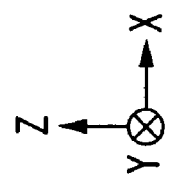
FIG. 4B
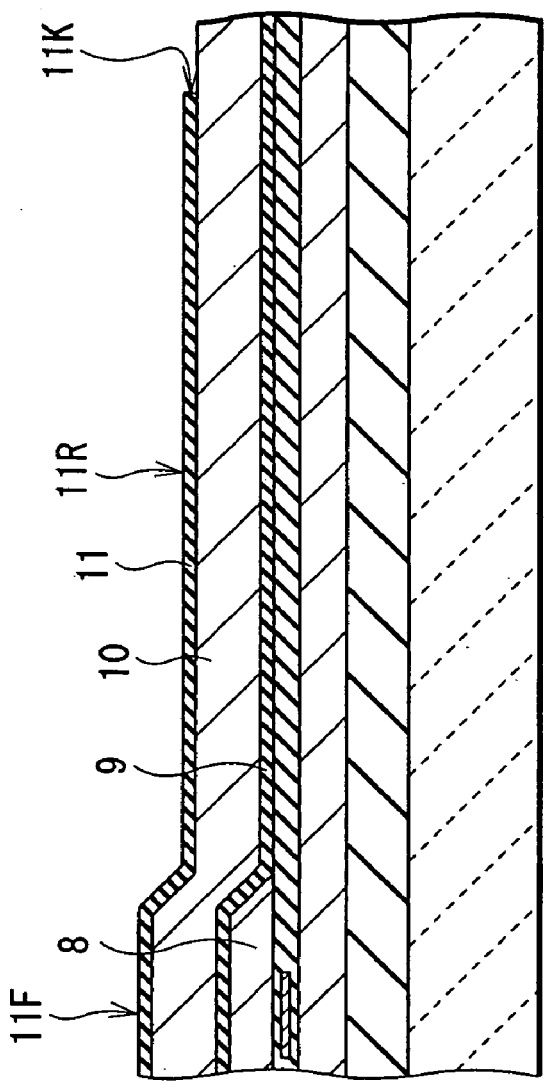
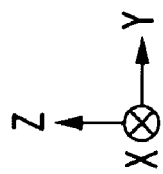
FIG. 4A

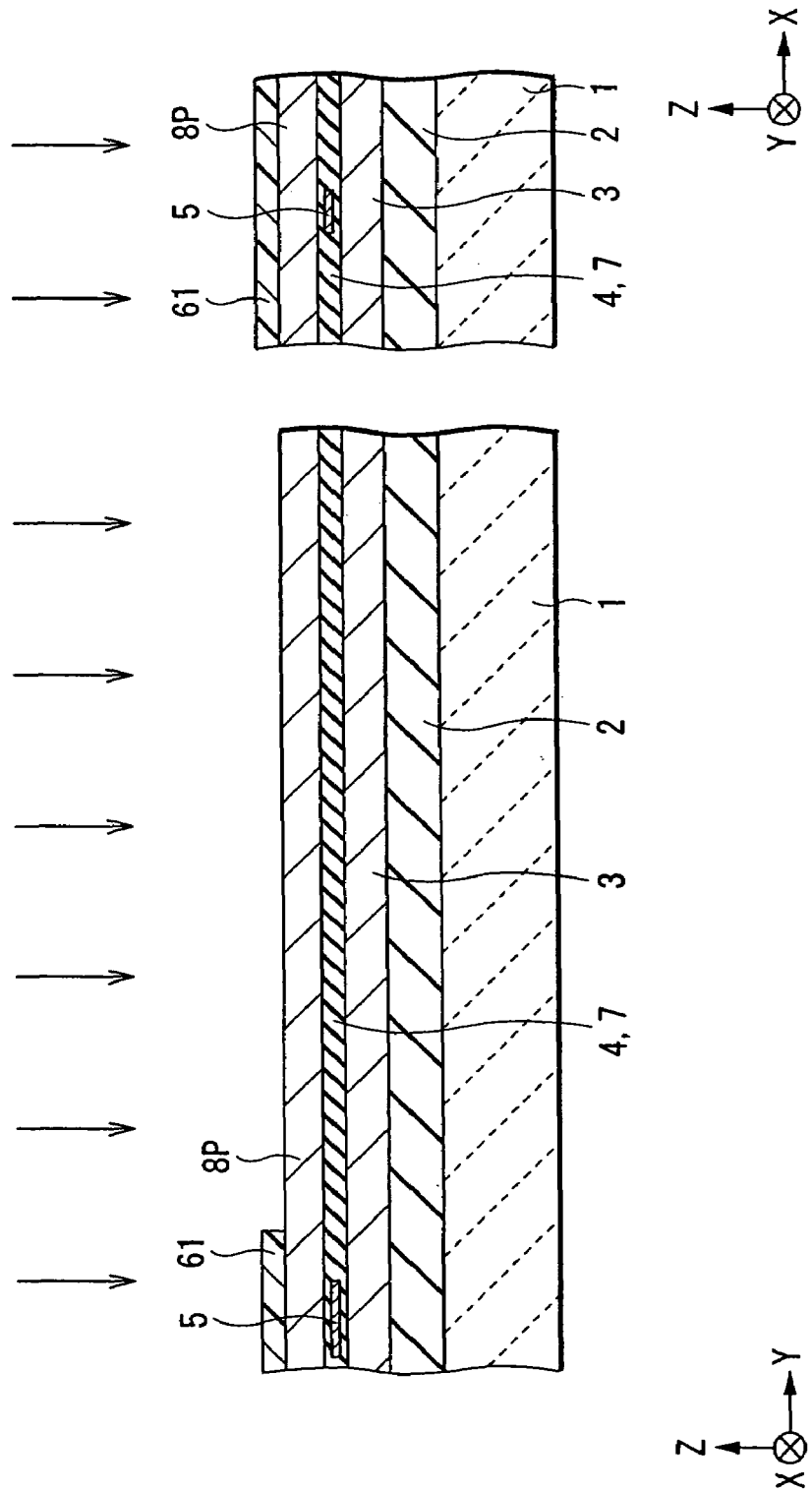

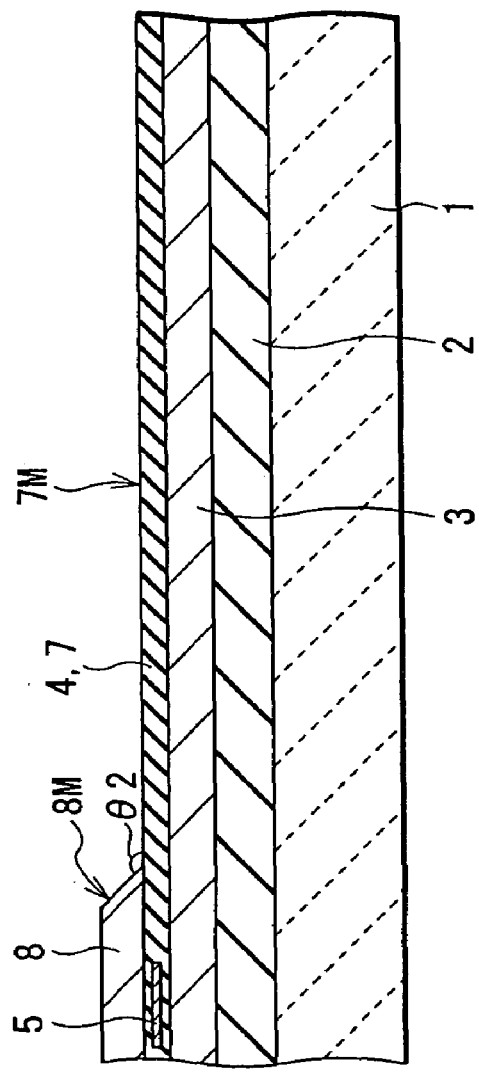
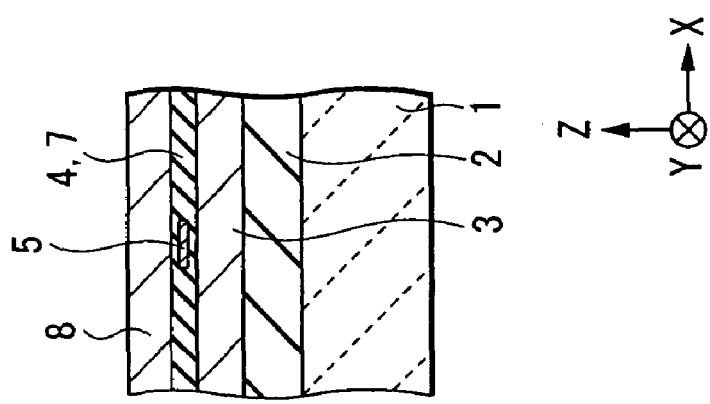
FIG. 17A
FIG. 17B

THIN FILM MAGNETIC HEAD AND METHOD OF MANUFACTURING THE SAME

CROSS-REFERENCE TO RELATED APPLICATIONS

This application is a Continuation of U.S. Ser. No. 09/990,490, filed on Nov. 15, 2001, now abandoned.

BACKGROUND OF THE INVENTION

1. Field of the Invention

The invention relates to a thin film magnetic head having an inductive magnetic transducer for writing and a magnetic transducer for reading, and a method of manufacturing the same.

2. Description of the Related Art

Recently, an improvement in performance of a thin film magnetic head has been sought in accordance with an increase in an areal density of a hard disk drive. For example, a composite thin film magnetic head, which has a stacked structure comprising a recording head having an inductive magnetic transducer for writing and a reproducing head having a magnetoresistive (hereinafter referred to as MR) element for reading, is widely used as the thin film magnetic head.

For example, the recording head includes a top pole and a bottom pole, which are located with a write gap in between on and under the write gap, respectively, and a coil for generating a magnetic flux with an insulating layer in between the top pole and the bottom pole. The top pole and the bottom pole have the same uniform width near the write gap in a region close to a recording-medium-facing surface (an air bearing surface) facing a magnetic recording medium (hereinafter referred to as "a recording medium"). The top pole and the bottom pole form "a magnetic pole portion" for determining a write track width. For example, the magnetic pole portion is formed in the following manner: the top pole having a uniform-width portion forming a part of the magnetic pole portion is formed, and then the write gap and the bottom pole are etched in self-alignment by using the uniform-width portion as a mask.

To increase the recording density of the performance of the recording head, it is necessary to locally miniaturize the width of the magnetic pole portion (a pole width) to the submicron order and thereby increase a track density on the recording medium. In this case, it is preferable that the pole width is uniform with high accuracy over the overall area of the magnetic pole portion. When the pole width is partly great, a side erase phenomenon occurs. Specifically, information is written not only on a track region on which the information is to be written, but also on a neighboring track region. Thus, information already written on the neighboring track region is overwritten with the information newly written thereon, and consequently the already-written information is erased.

Although the local miniaturization of the pole width to the submicron order is required, a problem has, however, heretofore existed: it is difficult to form with high accuracy the uniform-width portion of the top pole to be used as the mask for forming the magnetic pole portion. The problem arises for the following reason.

That is, for example, a coil for generating a magnetic flux is formed on a flat underlayer (e.g., a write gap), and then the coil is coated with an insulating layer made of a photoresist. As a result, a hill portion (hereinafter sometimes called "an apex portion") made of the photoresist is formed on the flat underlayer. The apex portion has a round inclined surface near the edge thereof, for example because a portion near the edge flows due to heat treatment subjected to the photoresist with which a peripheral region around the coil is to be filled. To form the top pole made of a plated film pattern in a region having an uneven structure formed of the apex portion and the like, a photoresist film formed in the region having the uneven structure is exposed to light in the step of forming a frame (a frame pattern) for forming the plated film pattern. Consequently, light is reflected obliquely or transversely from an inclined surface portion of the underlayer. Since the reflected light increases or reduces an exposed region in the photoresist film, the reflected light deteriorates the accuracy in forming the frame pattern. This makes it difficult to form with high accuracy the top pole, particularly the uniform-width portion having a local miniature width. The greater the height of the apex portion on the underlayer, the more noticeable the tendency to deteriorate the accuracy in forming the top pole.

SUMMARY OF THE INVENTION

The invention is designed to overcome the foregoing problems. It is an object of the invention to provide a thin film magnetic head and a method of manufacturing the same, which can locally miniaturize a pole width with high accuracy.

A thin film magnetic head of the invention including: two magnetic layers magnetically coupled to each other and having two magnetic poles which face each other with a gap layer in between and face a recording medium, a thin film coil provided between the two magnetic layers, and an insulating layer for insulating the thin film coil from the two magnetic layers includes: a magnetic transducer film; a first magnetic film provided between the magnetic transducer film and the two magnetic layers; and a second magnetic film provided opposite to the first magnetic film with the magnetic transducer film in between, wherein the first magnetic film extends to a first position in a direction away from a recording-medium-facing surface facing the recording medium, the thin film coil is provided in a region farther from the recording-medium-facing surface than a second position by using as a reference position the second position farther from the recording-medium-facing surface than the first position, and the second magnetic film extends from the recording-medium-facing surface to a third position farther from the recording-medium-facing surface than the second position.

A method of manufacturing a thin film magnetic head of the invention including: two magnetic layers magnetically coupled to each other and having two magnetic poles which face each other with a gap layer in between and face a recording medium, a thin film coil provided between the two magnetic layers, and an insulating layer for insulating the thin film coil from the two magnetic layers includes the steps of forming a magnetic transducer film; forming a first magnetic film between the magnetic transducer film and the two magnetic layers so as to extend to a first position in a direction away from a recording-medium-facing surface facing the recording medium; forming the thin film coil in a region farther from the recording-medium-facing-surface than a second position by using as a reference position the second position farther from the recording-medium-facing surface than the first position; and forming a second magnetic film opposite to the first magnetic film with the magnetic transducer film in between so as to extend from the recording-medium-facing surface to a third position farther from the recording-medium-facing surface than the second position.

In the thin film magnetic head of the invention or the method of manufacturing a thin film magnetic head of the invention, the thin film coil is provided in the region farther from the recording-medium-facing surface than the second position by using as the reference position the second position farther from the recording-medium-facing surface than the first position. Thus, a position of a surface of the thin film coil close to the second magnetic film is easily located closer to the second magnetic film than a position of a surface of the gap layer far from the second magnetic film.

In the thin film magnetic head of the invention or the method of manufacturing a thin film magnetic head of the invention, it is preferable that a length of the first magnetic film is equal to or less than ⅓ of a length of the insulating layer.

In the thin film magnetic head of the invention or the method of manufacturing a thin film magnetic head of the invention, it is preferable that the length of the first magnetic film is equal to or less than 10 μm.

In the thin film magnetic head of the invention or the method of manufacturing a thin film magnetic head of the invention, an end surface of the first magnetic film far from the recording-medium-facing surface may be inclined at an exterior angle of more than 90° in the direction in which the first magnetic film extends.

In the thin film magnetic head of the invention or the method of manufacturing a thin film magnetic head of the invention, it is preferable that the second magnetic film extends so that a surface of the second magnetic film close to the first magnetic film may be flat over the overall surface, and that the thin film coil is provided so that a position of a surface of the thin film coil close to the second magnetic film may be closer to the second magnetic film than a position of a surface of a portion of the gap layer near the recording-medium-facing surface, the surface being far from the second magnetic film.

In the thin film magnetic head of the invention or the method of manufacturing a thin film magnetic head of the invention, it is preferable that the thin film magnetic head further includes a connect wiring having one end connected to the magnetic transducer film and the other end connected to an external circuit, wherein the first magnetic film extends so as to coat a region in which the connect wiring is provided.

In the thin film magnetic head of the invention or the method of manufacturing a thin film magnetic head of the invention, one of the two magnetic layers close to the first magnetic film may be made of a different material from a material of the first magnetic film. Preferably, the one magnetic layer is made of a material having a higher saturation magnetic flux density than a saturation magnetic flux density of the material of the first magnetic film.

In the method of manufacturing a thin film magnetic head of the invention, the step of forming the first magnetic film may include the steps of forming a frame pattern for selectively forming a plated film pattern, by using a negative photoresist; and forming the first magnetic film made of the plated film pattern, by using the frame pattern. Alternatively, the step of forming the first magnetic film may include the steps of forming a preparatory magnetic layer for serving as a preparatory layer for the first magnetic film; and forming the first magnetic film by selectively etching the preparatory magnetic layer and thus patterning the preparatory magnetic layer.

Other and further objects, features and advantages of the invention will appear more fully from the following description.

BRIEF DESCRIPTION OF THE DRAWINGS

FIGS. 4A and 4B are cross sectional views for describing a step following the step of FIGS. 3A and 3B;

FIGS. 16A and 16B are cross sectional views for describing a step of a method of manufacturing a thin film magnetic head that is a modification to the method of manufacturing a thin film magnetic head according to the embodiment of the invention; and FIGS. 17A and 17B are cross sectional views for describing a step following the step of FIGS. 16A and 16B.

DETAILED DESCRIPTION OF THE PREFERRED EMBODIMENTS

An embodiment of the invention will be described in detail below with reference to the accompanying drawings. Firstly, the description is given with reference to FIGS. 1A and 1B to FIG. 9 with regard to a method of manufacturing a composite thin film magnetic head as a method of manufacturing a thin film magnetic head according to an embodiment of the invention. Since a thin film magnetic head according to the embodiment is embodied by the method of manufacturing a thin film magnetic head according to the embodiment, the thin film magnetic head will be described in conjunction with the method of manufacturing a thin film magnetic head. FIGS. 1A, 2A, 3A, 4A, 5A, 6A, 7A and 8A show a cross section perpendicular to an air bearing surface. FIGS. 1B, 2B, 3B, 4B, 5B, 6B, 7B and 8B show a cross section parallel to the air bearing surface. FIG. 9 is an enlarged view of the cross section shown in FIG. 1B. A lead layer 6 shown in FIG. 9 is not shown in FIGS. 1A and 1B to FIGS. 8A and 8B.

In the following description, an X-axis direction, a Y-axis direction and a Z-axis direction in FIGS. 1A and 1B to FIG. 9 are expressed as "a width (or a width direction)", "a length (or a length direction)" and "a thickness (or a thickness direction)", respectively. The side close to an air bearing surface 20 in the Y-axis direction (or the side to form the air bearing surface 20 in the following step) is expressed as "a front side (or a frontward side)", and the opposite side is expressed as "a rear side (or a rearward side)". The same expressions as the above-mentioned expressions are given in the description of FIG. 10 and the following drawings.

<Method of Manufacturing Thin Film Magnetic Head>

Figures 1A, 1B:
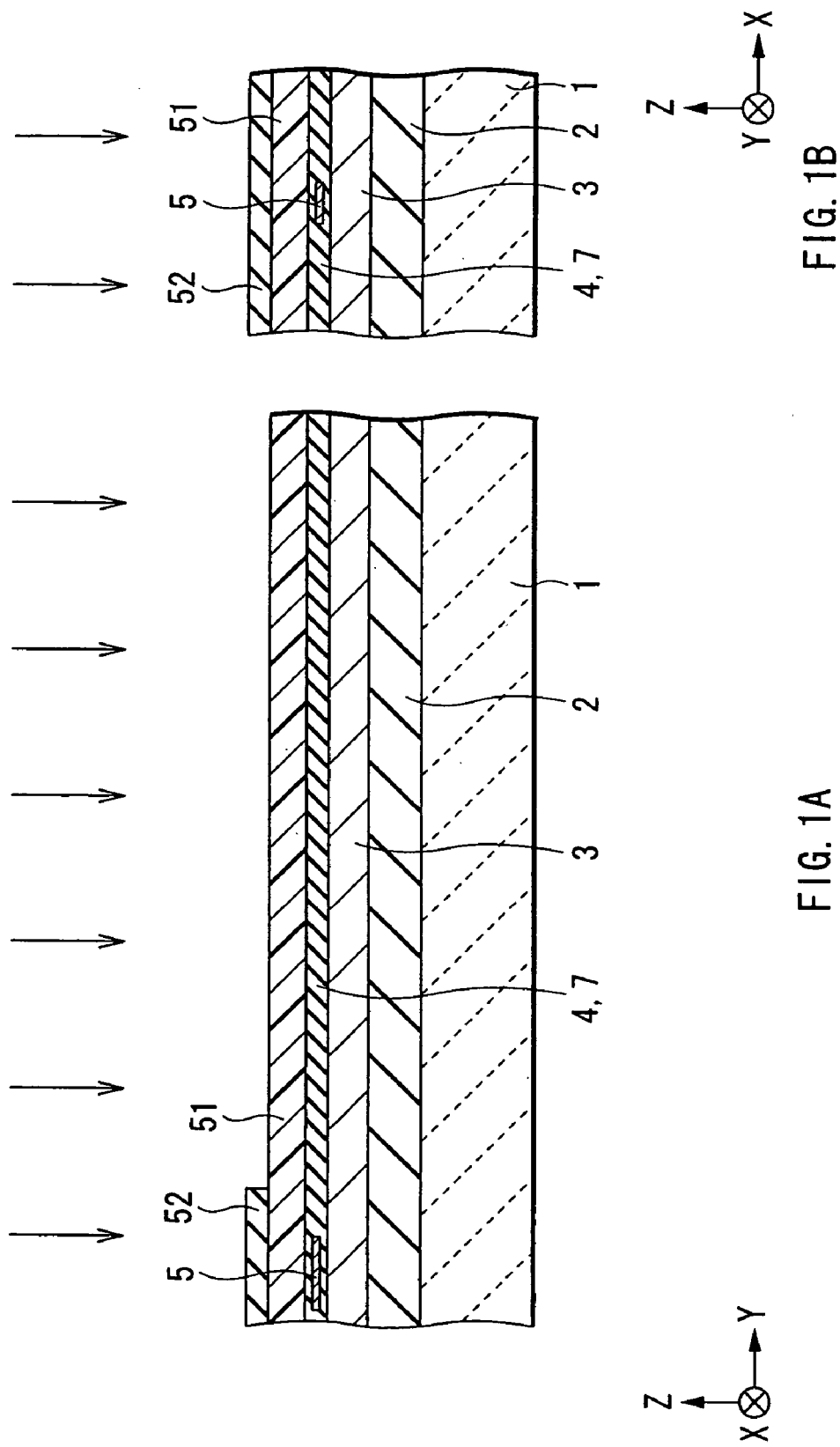
FIGS. 1A and 1B are cross sectional views for describing a step of a method of manufacturing a thin film magnetic head according to an embodiment of the invention.

In the method of manufacturing a thin film magnetic head according to the embodiment, first, as shown in FIGS. 1A and 1B, an insulating layer 2 made of, for example, aluminum oxide ($Al_2O_3$, hereinafter referred to as "alumina") is formed with a thickness of about 3 μm to 5 μm on a substrate 1 made of, for example, altic ($Al_2O_3$—TiC).

Next, as shown in FIGS. 1A and 1B, a bottom shield layer 3 made of, for example, a nickel-iron alloy (NiFe, hereinafter referred to as "permalloy (a trade name)") is selectively formed with a thickness of about 2 μm on the insulating layer 2 by plating to be described later, for example. For instance, the bottom shield layer 3 is formed so that the bottom shield layer 3 may have a planar shape shown in FIG. 10 to be described later and may extend to a third position P3 (see FIG. 10) located more rearward than a position (a second position P2) of a front end of a thin film coil 12 (see FIGS. 5A and 5B) to be formed in the following step. For example, a surface of the bottom shield layer 3 is substantially flat over the overall surface thereof. The bottom shield layer 3 corresponds to a specific example of "a second magnetic film" of the invention.

Figure 9:
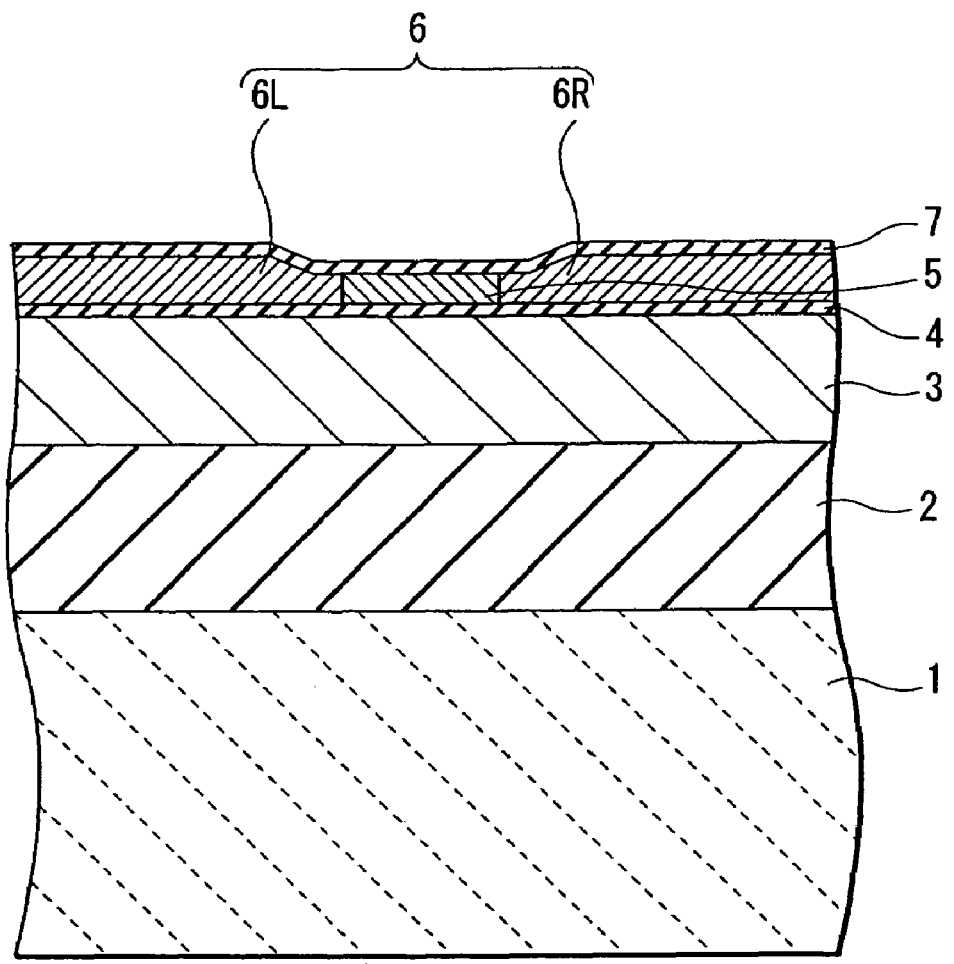
FIG. 9 is an enlarged view of a cross sectional structure shown in FIG. 1B.
Figure 10:
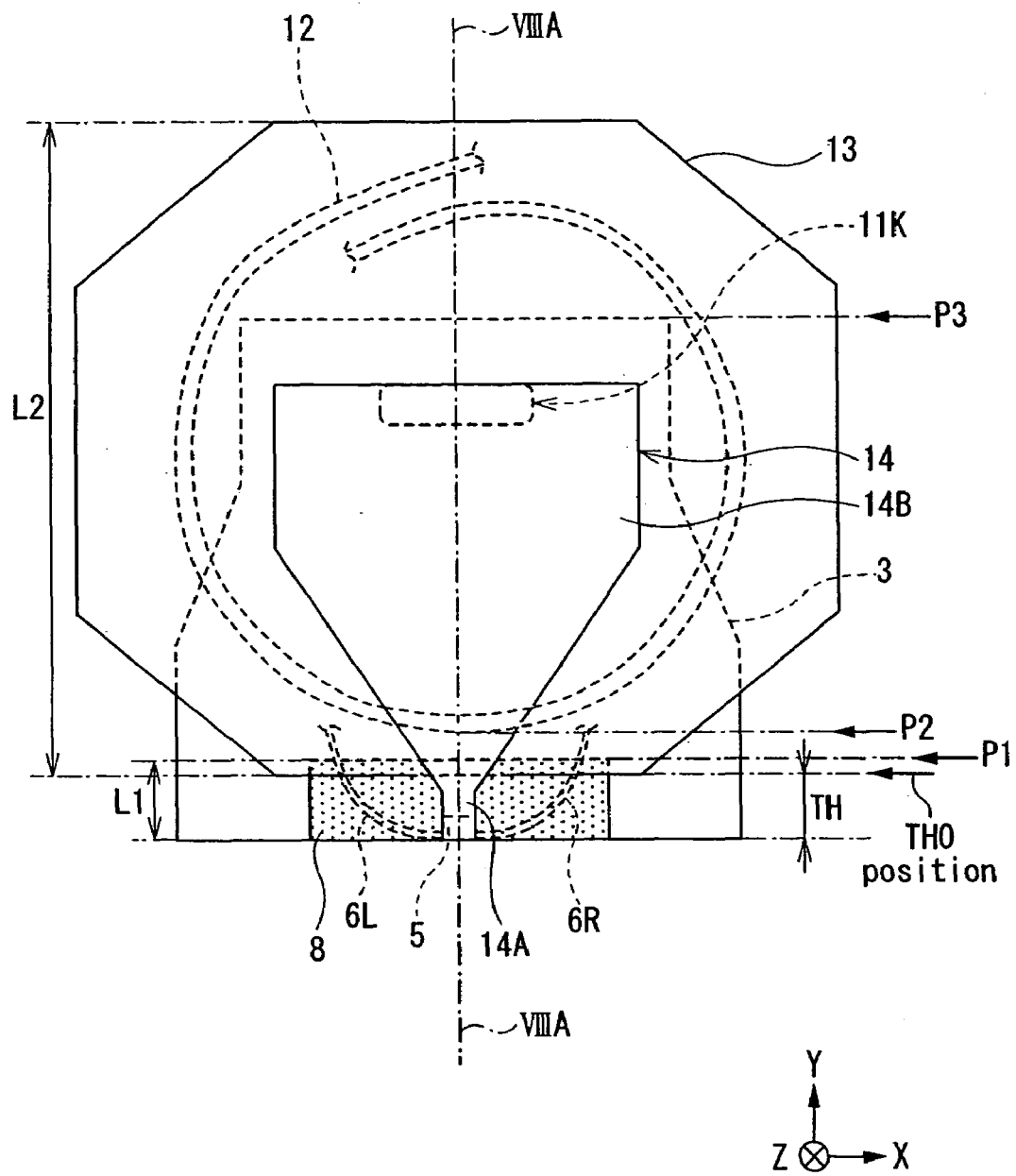
FIG. 10 is a plan view of a planar structure of a thin film magnetic head according to the embodiment of the invention.

Next, as shown in FIGS. 1A and 1B and FIG. 9, a shield gap film 4 made of, for example, alumina is formed with a thickness of about 0.01 μm to 0.1 μm on the bottom shield layer 3 by sputtering, for example. Then, an MR film 5 for forming an MR element is formed into a desired pattern on the shield gap film 4 by high-accuracy photolithography. Then, for example, two lead layers 6R and 6L (hereinafter sometimes called "a lead layer 6"), each of which functions as a lead electrode layer to be electrically connected to the MR film 5, are selectively formed by high-accuracy photolithography. The lead layers 6R and 6L are formed in such a manner that the respective ends thereof are connected to both sides of the MR film 5 and the respective other ends thereof are connected to an external circuit (not shown), as shown in FIG. 10 to be described later, for example. The MR film 5 corresponds to a specific example of "a magnetic transducer film" of the invention. The lead layer 6 (6R and 6L) corresponds to a specific example of "a connect wiring" of the invention.

Next, as shown in FIGS. 1A and 1B and FIG. 9, a shield gap film 7 is formed so as to coat the MR film 5 and the lead layer 6 by the same material as the material of the shield gap film 4 and the same method as the method of forming the shield gap film 4. Thus, the MR film 5 and the lead layer 6 are filled with the shield gap films 4 and 7. For example, a surface of the shield gap film 7 is substantially flat over the overall surface thereof.

Next, a top shield layer 8 (see FIGS. 3A and 3B to be described later) is selectively formed on the shield gap film 7 by plating, for example. The top shield layer 8 corresponds to a specific example of "a first magnetic film" of the invention.

The details about plating will be now described. To form the top shield layer 8 by plating, an electrode film (not shown) to be used as a seed layer for electroplating is first formed on the shield gap film 7 by sputtering, for example. For instance, permalloy or the like is used as a material of the electrode film. Then, the above-mentioned electrode film is coated with, for example, a negative photoresist film, whereby a photoresist film 51 is formed as shown in FIGS. 1A and 1B. Then, a photomask 52 having a predetermined shape pattern is selectively formed at a predetermined position on the photoresist film 51. "A predetermined position" at which the photomask 52 is to be formed is, for example, a position corresponding to a position at which the top shield layer 8 (see FIGS. 3A and 3B) is to be formed in the following step. "A predetermined shape pattern" is, for example, a shape corresponding to a planar shape of the top shield layer 8.

Figure 2A:
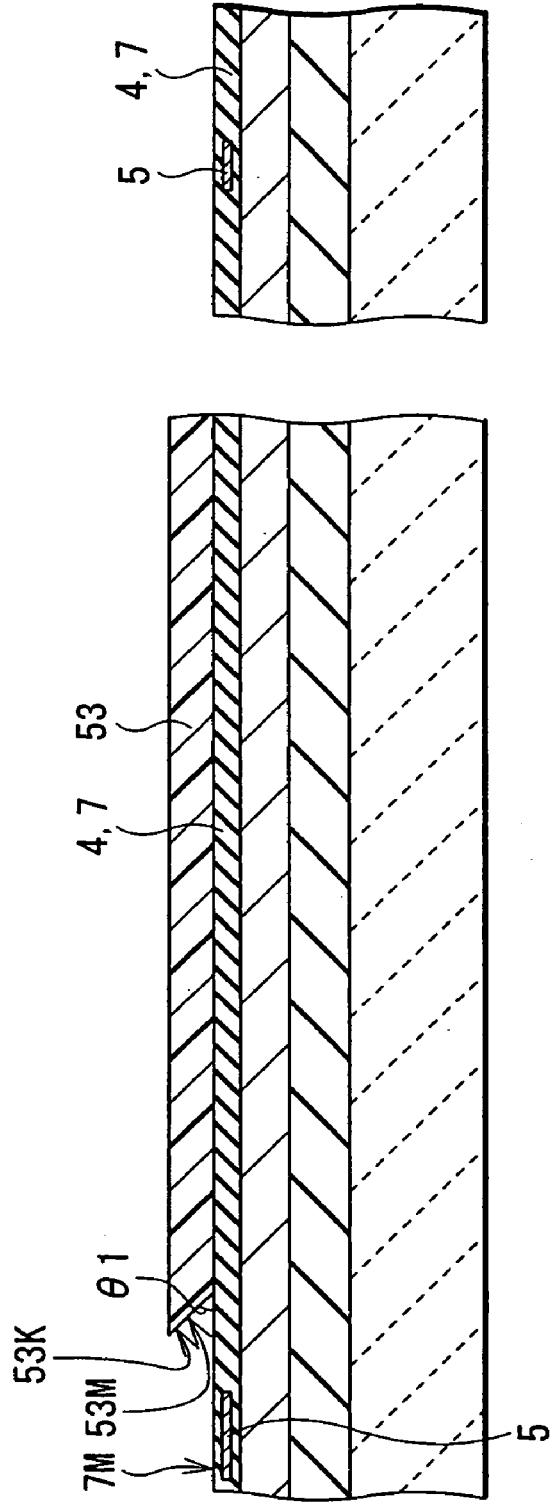
FIGS. 2A and 2B are cross sectional views for describing a step following the step of FIGS. 1A and 1B.
Figure 2B:

Next, the photoresist film 51 is selectively subjected to exposure and development using the photomask 52, whereby a frame pattern 53 having an opening 53K is formed on the shield gap film 7 as shown in FIGS. 2A and 2B. A negative photoresist is used as a material of the frame pattern 53. Thus, an end surface 53M of the frame pattern 53 at the opening 53K is inclined so that an exterior angle θ1 which the end surface 53M forms with a flat surface 7M of the shield gap film 7 may be less than 90°.

Figures 3A, 3B:
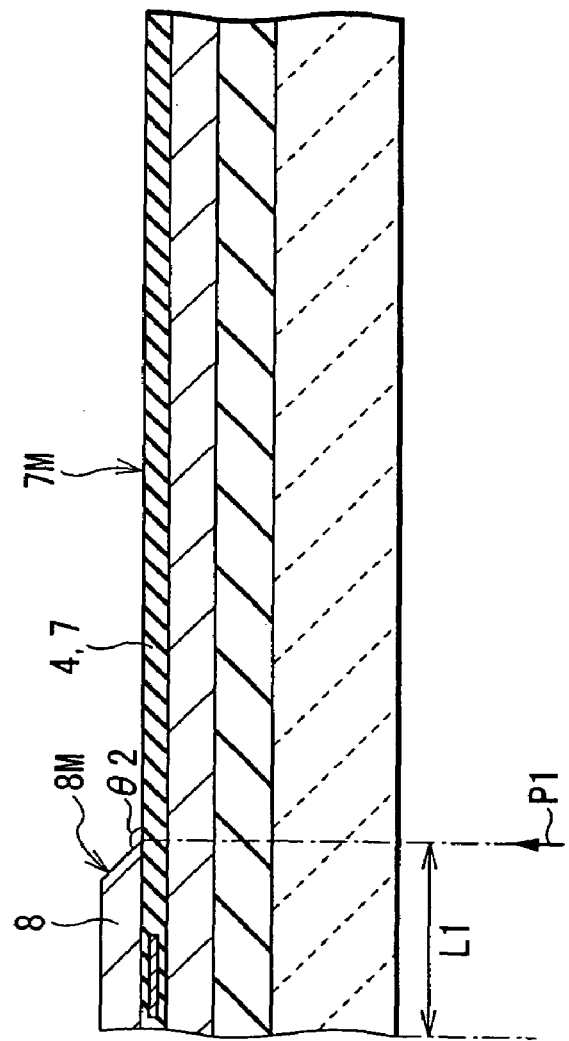
FIGS. 3A and 3B are cross sectional views for describing a step following the step of FIGS. 2A and 2B.

Next, the top shield layer 8 made of, for example, permalloy is selectively formed as shown in FIGS. 3A and 3B by electroplating using the frame pattern 53 as a mask and using as the seed layer the electrode film formed in the previous step. FIGS. 3A and 3B show a state after the top shield layer 8 is formed and then the frame pattern 53 is removed. The top shield layer 8 is formed so as to have a planar shape shown in FIG. 10 to be described later, for example. The top shield layer 8 is formed so that the top shield layer 8 may extend to a first position P1 located more frontward than the position (the second position P2) of the front end of the thin film coil 12 (see FIGS. 5A and 5B) to be formed in the following step. Moreover, the top shield layer 8 is formed so that a length L1 (μm) of the top shield layer 8 may be equal to or less than ⅓ of a length L2 (μm) (hereinafter sometimes called "a yoke length") of an insulating film 13 to be formed in the following step, specifically the length L1 may be equal to or less than about 10 μm. A rearward end surface 8M of the top shield layer 8 is inclined so that an exterior angle θ2 which the end surface 8M forms with the flat surface 7M of the shield gap film 7 may be more than 90° in accordance with the end surface 53M of the frame pattern 53.

Subsequently, the method of manufacturing a thin film magnetic head will be described with reference to FIGS. 4A and 4B. After forming the top shield layer 8, an insulating film 9 made of, for example, alumina is formed with a thickness of about 0.1 μm to 0.2 μm over the overall surface by sputtering, for example. Then, a bottom pole 10 made of, for example, permalloy is selectively formed with a thickness of about 2.0 μm to 3.0 μm over the overall surface by plating, for example. The bottom pole 10 corresponds to a specific example of "one magnetic layer" of the invention.

Next, as shown in FIGS. 4A and 4B, a write gap layer 11 made of, for example, alumina is formed with a thickness of about 0.1 μm to 0.3 μm over the overall surface by sputtering, for example. At this time, an opening 11K for connecting the bottom pole 10 to a top pole 14 (see FIGS. 5A and 5B) to be formed in the following step is formed in the write gap layer 11. The write gap layer 11 extends along the region having the uneven structure including the bottom shield layer 3, the top shield layer 8 and so on. A position of a surface of a rearward region 11R of the write gap layer 11 is lower than a position of a surface of a frontward region 11F of the write gap layer 11. The write gap layer 11 corresponds to a specific example of "a gap layer" of the invention.

Figures 5A, 5B:
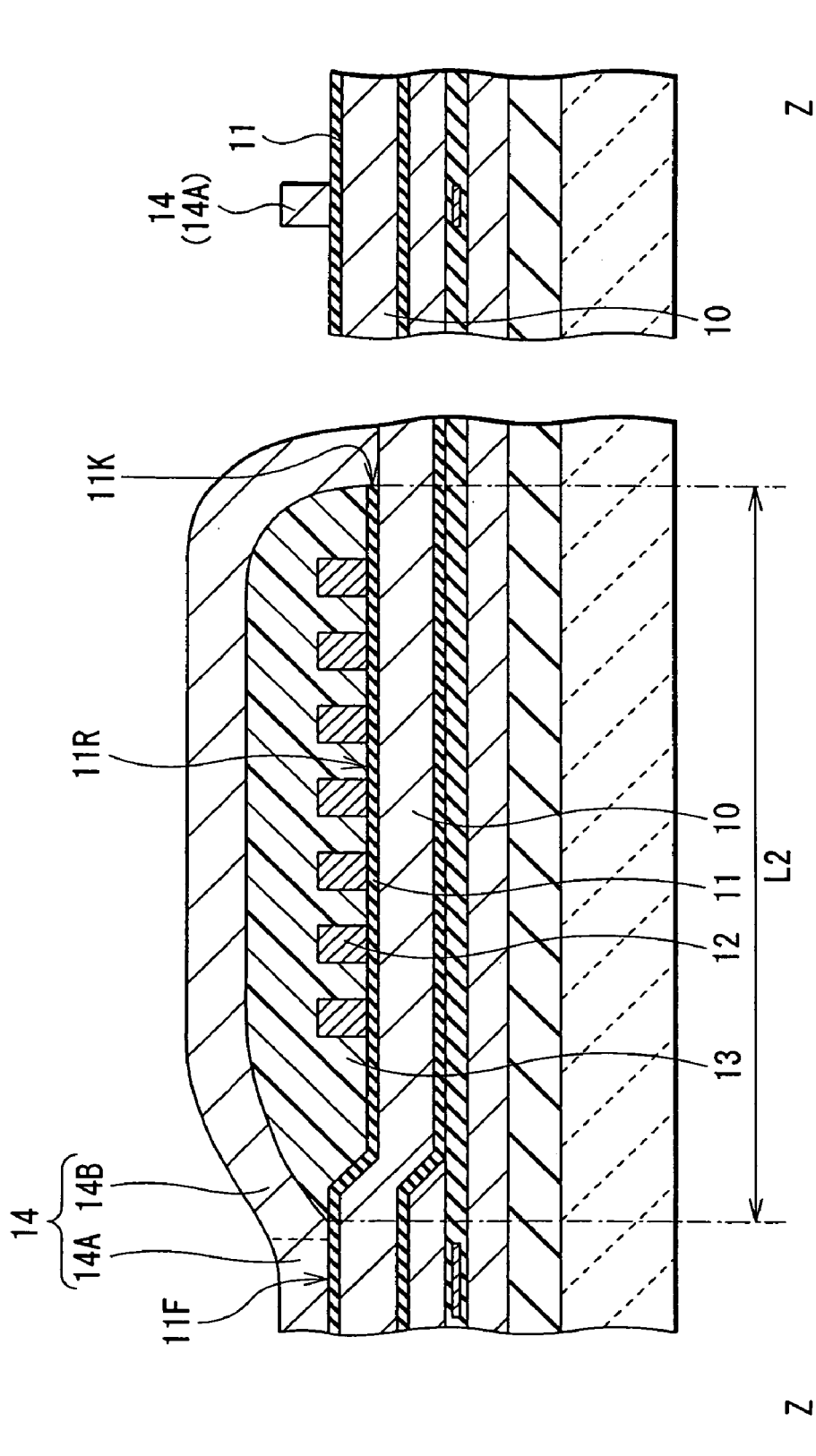
FIGS. 5A and 5B are cross sectional views for describing a step following the step of FIGS. 4A and 4B.

Next, as shown in FIGS. 5A and 5B, the thin film coil 12 for an inductive recording head, which is made of, for example, copper (Cu), is selectively formed with a thickness of about 1.5 µm on the rearward region 11R of the write gap layer 11 by electroplating, for example. The thin film coil 12 is formed so as to have a spiral planar structure shown in FIG. 10 to be described later, for example. The thin film coil 12 is, in part alone, shown in FIGS. 5A and 5B.

Next, a material exhibiting fluidity during heating, e.g., an organic insulating material such as a photoresist is formed into a predetermined pattern by high-accuracy photolithography so that the material may coat the thin film coil 12 and a peripheral region around the thin film coil 12. Then, the photoresist film is subjected to heat treatment at a temperature within a range of from about 200° C. to 250° C. As shown in FIGS. 5A and 5B, the heat treatment allows the photoresist to flow and thus fill up a space between windings of the thin film coil 12, so that the insulating film 13 for insulating the thin film coil 12 from the peripheral region is formed. The insulating film 13 has a round inclined surface near the edge thereof because of the flowing of the photoresist film. The insulating film 13 corresponds to a specific example of "an insulating layer" of the invention.

Next, in a region ranging from the frontward region 11F of the write gap layer 11 to an exposed surface of the bottom pole 10 at the opening 11K, the top pole 14 made of, for example, permalloy is selectively formed with a thickness of about 2.0 µm to 3.0 µm by the same plating as plating for forming the top shield layer 8, for example. For instance, as shown in FIG. 10 to be described later, the top pole 14 is formed so as to include a tip portion 14A close to the side to form the air bearing surface 20 in the following step and a yoke portion 14B next to the tip portion 14A. Moreover, the top pole 14 is formed so that the tip portion 14A may have a local miniature uniform width (e.g., about 0.3 µm) for determining a write track width. Features of a shape of the top pole 14 will be described later The top pole 14 is magnetically coupled to the bottom pole 10 at the opening 11K. Thus, a path through which a magnetic flux propagates, i.e., a magnetic path is formed of the bottom pole 10 and the top pole 14.

Figures 6A, 6B:
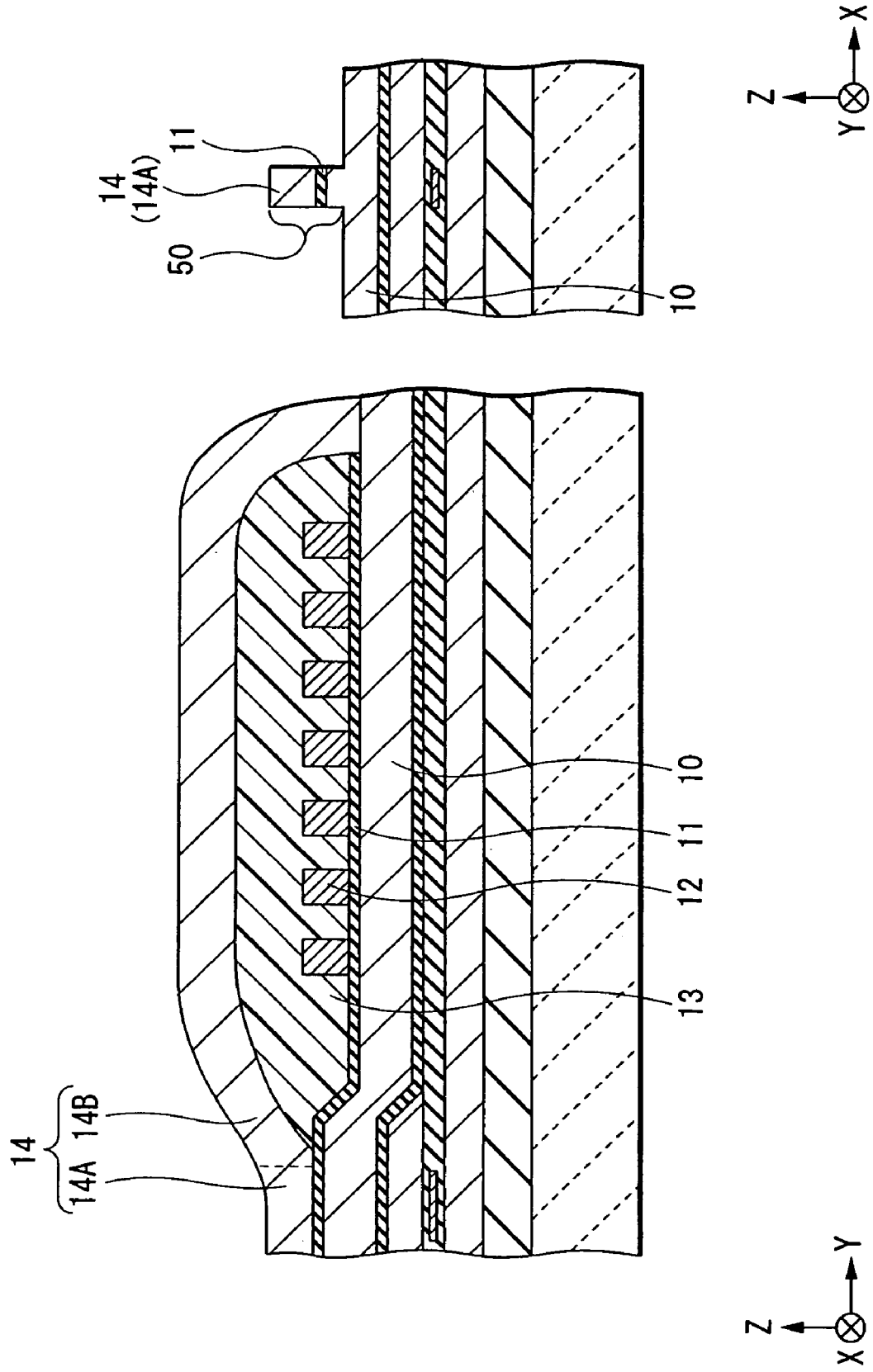
FIGS. 6A and 6B are cross sectional views for describing a step following the step of FIGS. 5A and 5B.

Next, the write gap layer 11 and the bottom pole 10 around the tip portion 14A are etched about 0.5 µm in self-alignment by using, for example, ion milling or RIE (Reactive Ion Etching) using the tip portion 14A of the top pole 14 as a mask. Thus, a magnetic pole portion 50 having a trim structure is formed as shown in FIGS. 6B and 6B. The magnetic pole portion 50 is formed of the tip portion 14A of the top pole 14, a portion of the bottom pole 10 corresponding to the tip portion 14A, and a part of the write gap layer 11 sandwiched between the tip portion 14A and the portion of the bottom pole 10. These portions have substantially the same width.

Figures 7A, 7B:
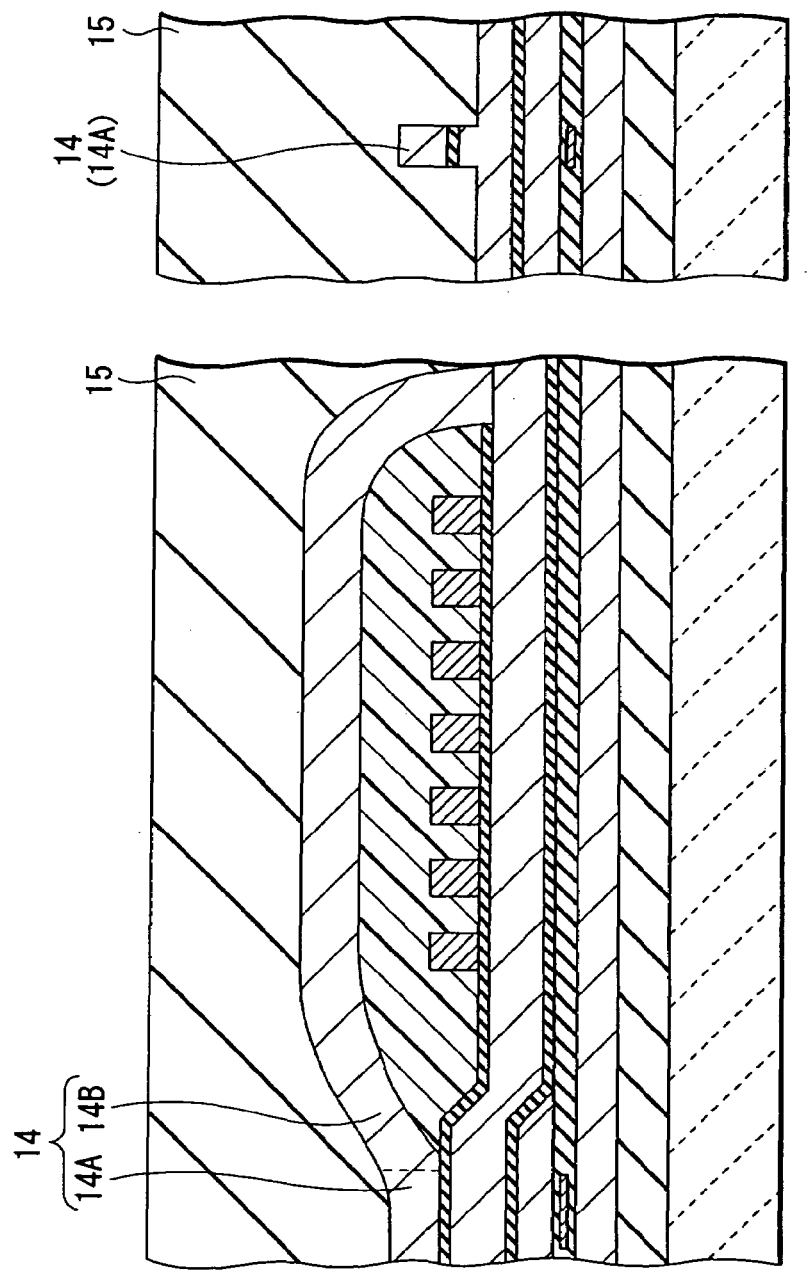
FIGS. 7A and 7B are cross sectional views for describing a step following the step of FIGS. 6A and 6B.

Next, as shown in FIGS. 7A and 7B, an overcoat layer 15 made of an insulating material, e.g., an inorganic insulating material such as alumina is formed with a thickness of about 20 µm to 40 µm so as to coat the overall surface.

Figures 8A, 8B:
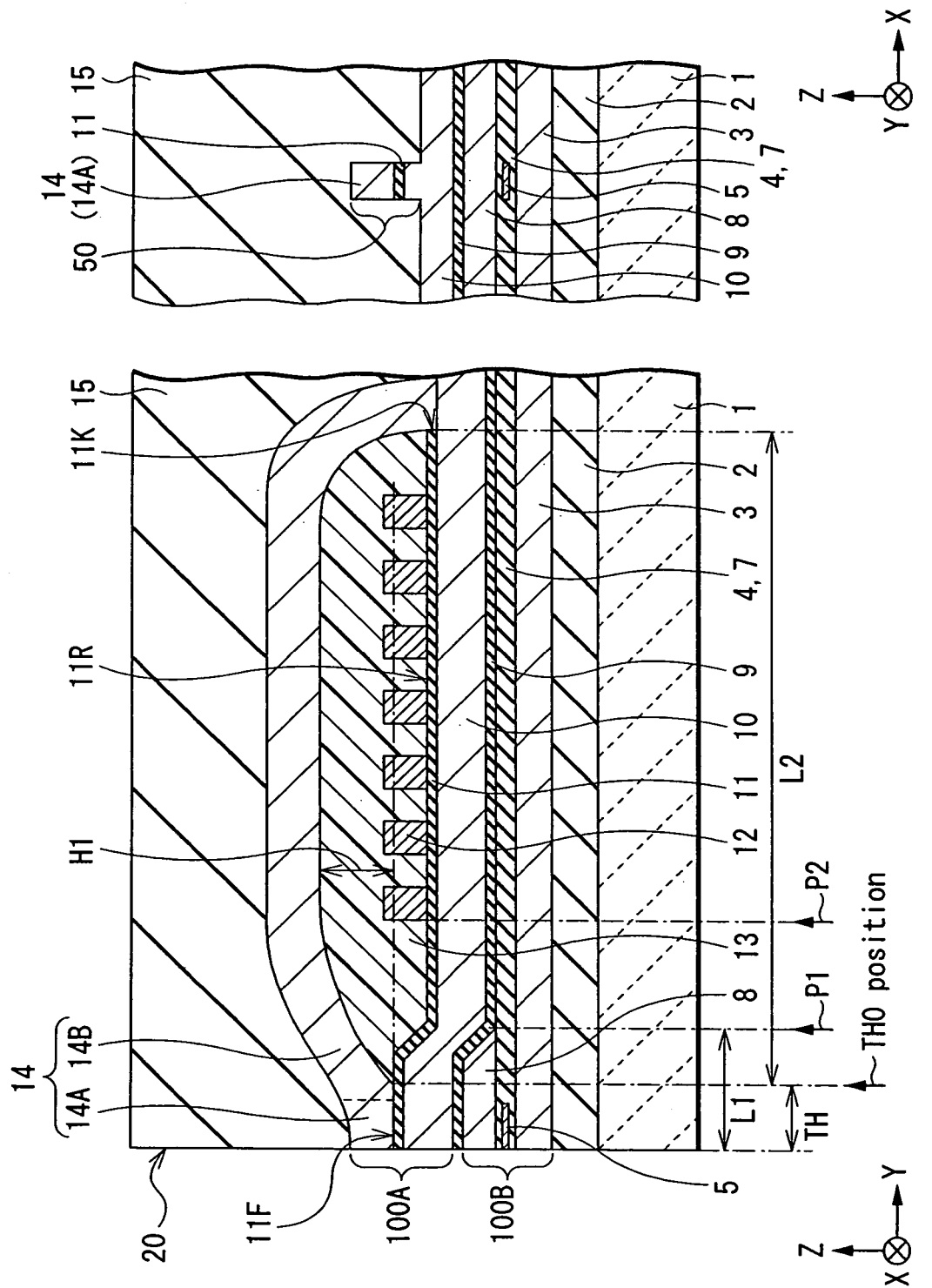
FIGS. 8A and 8B are cross sectional views for describing a step following the step of FIGS. 7A and 7B.

Finally, as shown in FIGS. 8A and 8B, the air bearing surface 20 of a recording head and a reproducing head is formed by machining and polishing. As a result, a thin film magnetic head is completed.

<Structure of Thin Film Magnetic Head>

Next, the planar structure of the thin film magnetic head according to the embodiment will be described with reference to FIG. 10.

FIG. 10 shows a schematic representation of the planar structure of the thin film magnetic head manufactured by the method of manufacturing a thin film magnetic head according to the embodiment. The substrate 1, the insulating layer 2, the overcoat layer 15 and so on are not shown in FIG. 10. The thin film coil 12 is, in part alone, shown in FIG. 10, specifically only the outermost periphery thereof is shown in FIG. 10. FIG. 8A shows a cross section taken along the line VIIIA—VIIIA of FIG. 10.

A position of a front end of the insulating film 13 corresponds to a reference position for determining one factor that determines performance of a recording head, i.e., a throat height (TH), namely, a position at which the throat height is equal to zero (a TH0 position). The throat height (TH) is defined as a length between the position of the front end of the insulating film 13 (the TH0 position) and the air bearing surface 20.

As described above, the bottom shield layer 3 extends from the air bearing surface 20 to the third position P3 located more rearward than the position (the second position P2) of the front end of the thin film coil 12. FIG. 10 shows, for example, the case in which a position (the third position P3) of a rear end of the bottom shield layer 3 is located more rearward than a position of a rear end of the top pole 14. As described above, the top shield layer 8 extends from the air bearing surface 20 to the first position P1 located more frontward than the second position P2 of the thin film coil 12. The top shield layer 8 has a rectangular planar shape, for example.

As described above, for example, the top pole 14 includes the tip portion 14A close to the air bearing surface 20, the tip portion 14A having a local miniature uniform width for determining the write track width; and the yoke portion 14B next to the tip portion 14A, the yoke portion 14B having a greater width than the width of the tip portion 14A and being used to contain a magnetic flux generated by the thin film coil 12. The tip portion 14A has a rectangular planar shape, for example. For instance, the width of the yoke portion 14B is substantially uniform at the rearward portion thereof, and the width thereof is gradually narrower at the frontward portion thereof closer to the air bearing surface 20.

<Operation of Thin Film Magnetic Head>

Next, an operation of the thin film magnetic head according to the embodiment will be described with reference to FIGS. 8A and 8B and FIG. 10. The thin film magnetic head comprises a composite thin film magnetic head having an integrated structure comprising a recording head 100A for recording information on a recording medium and a reproducing head 100B for reproducing information recorded on the recording medium (see FIGS. 8A and 8B).

In the thin film magnetic head, at the time of a recording operation of information, a current passes through the thin film coil 12 of the recording head 100A from an external circuit (not shown), so that a magnetic flux is generated in response to the current. After the generated magnetic flux is contained in the yoke portion 14B of the top pole 14, the magnetic flux propagates from the yoke portion 14B to the tip portion 14A. The magnetic flux, which propagates to the tip portion 14A, further propagates and reaches to an end portion of the tip portion 14A close to the air bearing surface 20. By the magnetic flux that reaches to the end portion of the tip portion 14A, a signal field for recording is generated near the write gap layer 11. The signal field allows a magnetic recording medium to be partly magnetized, thereby enabling information to be recorded on the magnetic recording medium.

At the time of a reproducing operation of information, a sense current is passed through the MR film 5 of the reproducing head 100B. Resistance of the MR film 5 changes in response to a reproducing signal field from the magnetic recording medium. Thus, a change in the resistance is detected according to a change in the sense current, whereby information recorded on the magnetic recording medium can be read out.

<Functions and Effects of Embodiment>

Figures 11A, 11B:
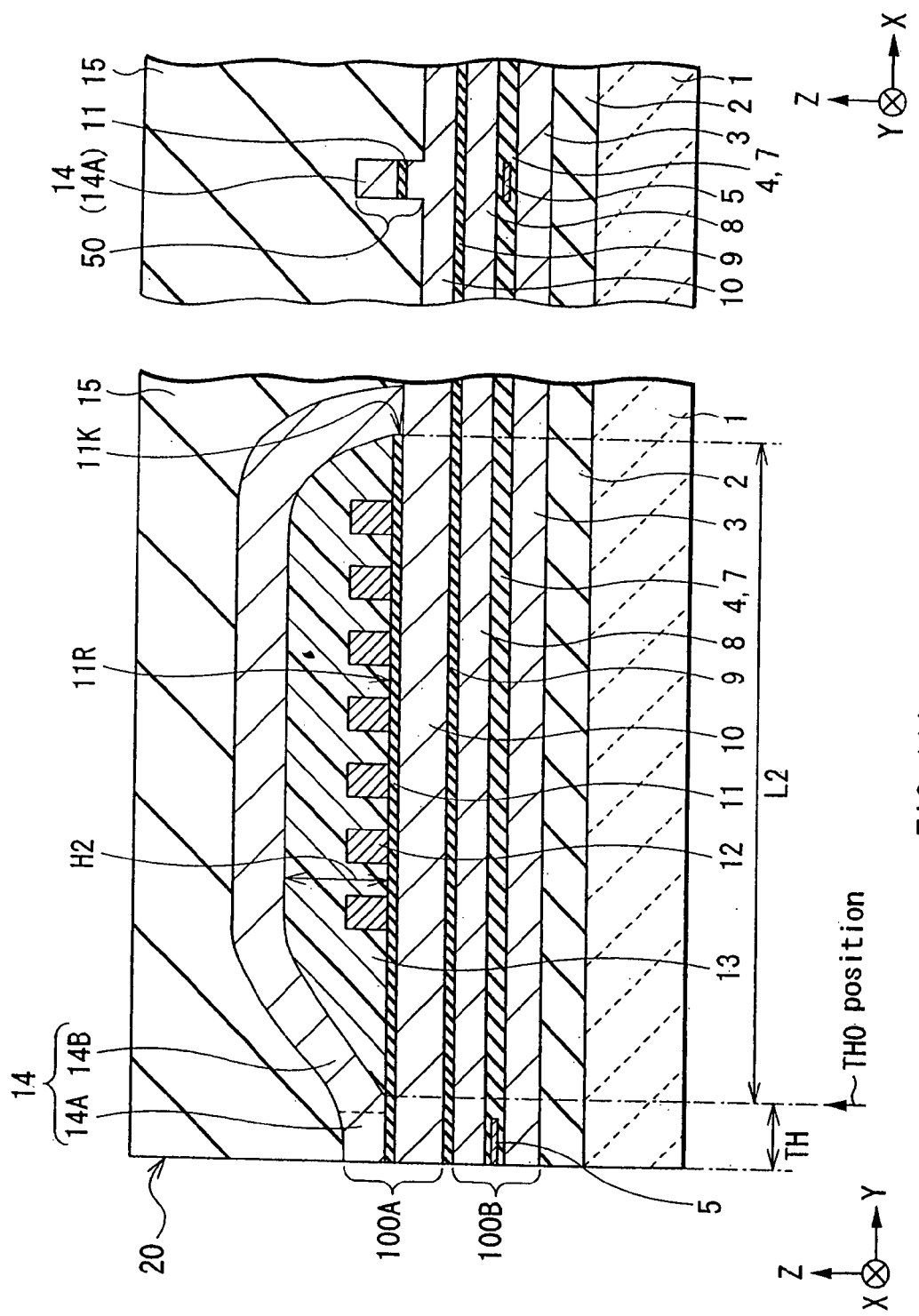
FIGS. 11A and 11B are cross sectional views of a cross sectional structure of a thin film magnetic head that is a comparison to the thin film magnetic head according to the embodiment of the invention.

Next, functions and effects of the embodiment will be described with reference to FIGS. 8A and 8B and FIGS. 11A and 11B. FIGS. 11A and 11B show a sectional structure of a thin film magnetic head that is a comparison to the thin film magnetic head of the embodiment. FIGS. 11A and 11B correspond to FIGS. 8A and 8B, respectively. In the embodiment, the thin film coil 12 is located in a region located more rearward than a position (the first position P1) of a rear end of the top shield layer 8. Therefore, the magnetic pole portion 50 having a local miniature uniform width can be formed with high accuracy for the following reason.

That is, to form, by using plating, the top pole 14 on an underlayer including a hill portion (an apex portion) formed of the insulating film 13, the accuracy in forming the top pole 14 depends on a height of the apex portion for the following reason. In the step of forming a frame pattern for forming the top pole 14, exposure is subjected to a photoresist film formed on the underlayer including the apex portion. Thus, light is reflected obliquely or transversely from mainly a surface of an electrode film formed on a front inclined surface portion of the apex portion. Then, an influence of the reflected light causes an expansion or a reduction in an exposed region in the photoresist film. This deteriorates the accuracy in forming the frame pattern. In order to form the magnetic pole portion 50 having a local miniature uniform width, the tip portion 14A of the top pole 14 must be formed with high accuracy. Therefore, a portion of the frame pattern corresponding to the tip portion 14A must be formed with high accuracy.

However, in the comparison (see FIGS. 11A and 11B), the top shield layer 8 extends more rearward than the thin film coil 12, similarly to the bottom shield layer 3. In this case, since the thin film coil 12 and the insulating film 13 are formed over the overall surface on the flat write gap layer 11, an attempt to ensure an insulating region having a sufficient thickness between the thin film coil 12 and the top pole 14 causes an increase in a height H2 (μm) of the apex portion. The greater height H2 causes a larger inclined surface region of the apex portion and thus a larger amount of reflected light having an adverse influence on the accuracy in forming the frame pattern. Consequently, the accuracy in forming the frame pattern deteriorates greatly.

In the embodiment (see FIGS. 8A and 8B), the bottom shield layer 3 extends to the third position P3 located more rearward than the position (the second position P2) of the front end of the thin film coil 12, and the top shield layer 8 extends to the first position P1 located more frontward than the second position P2. In this case, when it is assumed that a plurality of components (e.g., the bottom pole 10 and so on) formed between the step of forming the top shield layer 8 and the step of forming the thin film coil 12 has the respective uniform thicknesses, a step is formed in the write gap layer 11 in accordance with the uneven region including the bottom shield layer 3 and the top shield layer 8. Thus, the position of the surface of the underlayer on which the thin film coil 12 is to be formed, i.e., the rearward region 11R of the write gap layer 11 is lower than the position of the surface of the frontward region 11F. Thus, when an insulating material having a sufficient thickness is located between the thin film coil 12 and the top pole 14, a height H1 (μm) of the apex portion is smaller than the height (the height H2) of the comparison. Therefore, the inclined surface region of the apex portion decreases, and thus the amount of reflected light having an adverse influence on the accuracy in forming the frame pattern decreases. As a result, the portion of the frame pattern corresponding to the tip portion 14A can be formed with high accuracy. Incidentally, the height H1 depends on a thickness of the top shield layer 8. In other words, the height H1 can be changed by controlling the thickness of the top shield layer 8.

Figure 12:
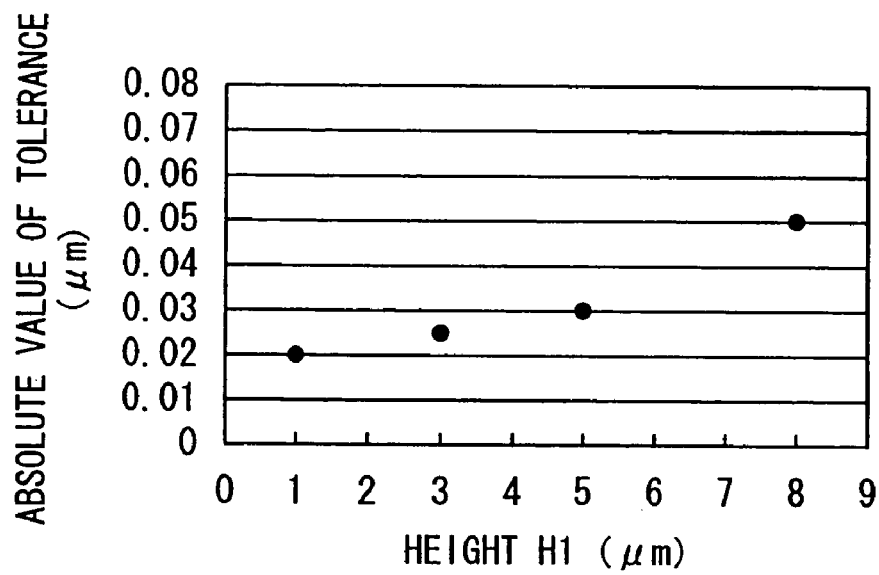
FIG. 12 is a plot of experimental results about the accuracy in forming a top pole.

This is also apparent from experimental results about the accuracy in forming the top pole 14 (the tip portion 14A) shown in FIG. 12. FIG. 12 shows the correlation between the height H1 of the apex portion and the accuracy in forming the tip portion 14A. In FIG. 12, "the axis of abscissas" represents the height H1 (μm), and "the axis of ordinates" represents absolute values (μm) of tolerances to a desired width (0.3 μm) of the tip portion 14A (the tolerance refers to the amount of deviation from the target width). As shown in FIG. 12, as the height H1 is smaller, the absolute value of the tolerance is smaller and therefore the accuracy in forming the tip portion 14A is higher.

In the embodiment, the length L1 of the top shield layer 8 is equal to or less than ⅓ of the yoke length. Thus, for the following reason, a necessary and sufficient amount of magnetic flux can be ensured while the above-mentioned accuracy in forming the top pole 14 being ensured excellently. That is, when the thin film coil 12 is formed on the flat rearward region 11R of the write gap layer 11 (see FIGS. 8A and 8B), the following occurs. When the length L1 of the top shield layer 8 increases, a position of the step of the write gap layer 11, i.e., a position of a boundary between the frontward region 11F and the rearward region 11R is located rearward, and thus the region on which the thin film coil 12 is to be formed, i.e., the rearward region 11R becomes narrow. In this case, the region to be occupied by the thin film coil 12 must be reduced according to the area of the rearward region 11R, and thus the winding number of the thin film coil 12 must be reduced. When the winding number of the thin film coil 12 decreases, the amount of magnetic flux decreases. In order to ensure a necessary and sufficient amount of magnetic flux, it is therefore necessary to, by controlling the length L1 of the top shield layer 8, properly ensure the region (the rearward region 11R) on which the thin film coil 12 is to be formed so as to increase the winding number of the coil.

Figure 13:
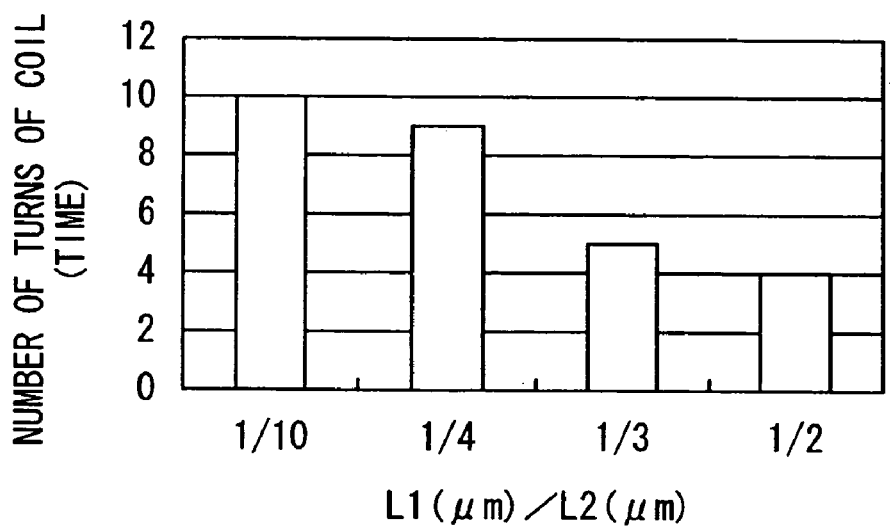
FIG. 13 is a graph of experimental results about the winding number of a thin film coil.

FIG. 13 shows experimental results about the winding number of the thin film coil 12. In FIG. 13, "the horizontal axis" represents the ratio (L1/L2) of the length L1 (μm) of the top shield layer 8 to the yoke length L2 (μm), and "the vertical axis" represents the winding number of the thin film coil 12 (time). The yoke length L2 is equal to about 20 μm, an interval between the windings of the thin film coil 12 is equal to 2 windings/2.5 μm, and the yoke length L2 and the interval are fixed. As shown in FIG. 13, the winding number of the thin film coil 12 increases as the L1/L2 ratio decreases. More particularly, when the L1/L2 ratio is equal to or lower than ⅓, five or more turns capable of generating a necessary and sufficient amount of magnetic flux can be ensured.

In the embodiment, the length L1 of the top shield layer 8 is equal to or less than 10 μm. Thus, for the following reason, the propagation of magnetic flux during the operation of the thin film magnetic head can be smoothed while the accuracy in forming the top pole 14 being ensured excellently. That is, for example, when the winding number of the thin film coil 12 is fixed (see FIGS. 8A and 8B), the following occurs. When the length L1 of the top shield layer 8 is increased, as the position of the boundary between the frontward region 11F and the rearward region 11R of the write gap layer 11 is located rearward, the position of the surface of the underlayer at the position at which the thin film coil 12 is to be formed is higher more away from the front side thereof. Consequently, the height H1 increases. In this case, the greater height H1 causes a longer length of the top pole 14 and thus a longer length of the magnetic path. Since the longer length of the magnetic path causes higher magnetic resistance in the magnetic path, the propagation of magnetic flux is prevented. In order to smooth the propagation of magnetic flux, it is therefore necessary to, by controlling the length L1 of the top shield layer 8, reduce the length of the magnetic path and reduce the magnetic resistance in the magnetic path.

Figure 14:
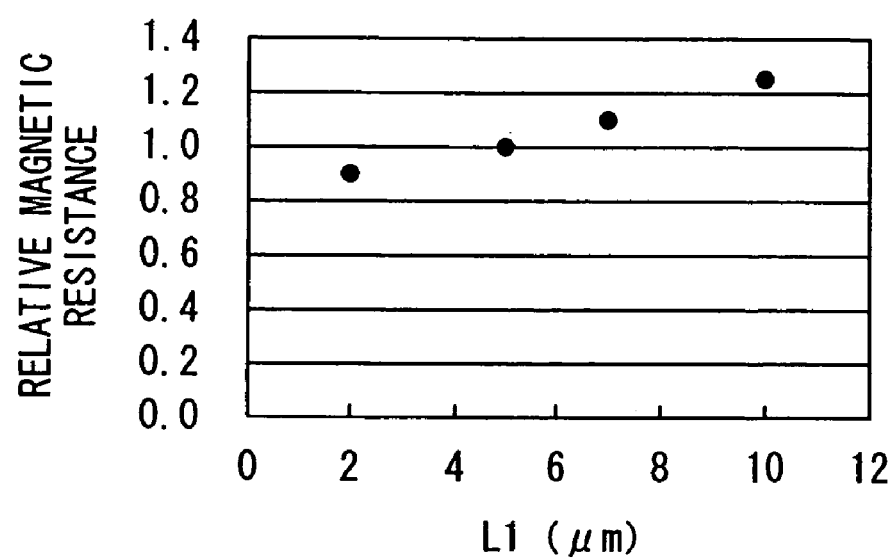
FIG. 14 is a plot of experimental results about magnetic resistance in a magnetic path.

FIG. 14 shows experimental results about the magnetic resistance in the magnetic path. In FIG. 14, "the axis of abscissas" represents the length L1 (μm) of the top shield layer 8, and "the axis of ordinates" represents relative magnetic resistance, which is obtained when magnetic resistance is assumed to be "1" in the case where the length L1 of the top shield layer 8 is equal to 5 μm. Incidentally, the winding number of the thin film coil 12 is equal to 9. As shown in FIG. 14, the relative magnetic resistance decreases as the length L1 of the top shield layer 8 decreases. More particularly, the length L1 is equal to or less than 10 μm, thereby enabling a magnetic flux to propagate smoothly.

In the embodiment, the rearward end surface 8M of the top shield layer 8 is inclined so that the exterior angle θ2 which the end surface 8M forms with the flat surface 7M of the shield gap film 7 may be more than 90°. Therefore, a portion of the bottom pole 10 corresponding to a boundary portion between the frontward region 11F and the rearward region 11R is shaped into a crank. In this case, the propagation of magnetic flux through the bottom pole 10 can be smoothed, as compared to the case where the above-mentioned boundary portion of the bottom pole 10 is cranked at 90°.

In the embodiment, the top shield layer 8 functions as a shielding material against magnetic noise or the like. Thus, the top shield layer 8 prevents the magnetic noise or the like caused by the recording head 100A from reaching to the lead layer 6 of the reproducing head 100B. It is therefore possible to prevent the occurrence of a problem about the operation of the reproducing head 100B caused due to the magnetic noise reaching to the lead layer 6 (e.g., poor reading of information, etc.).

Figure 15:
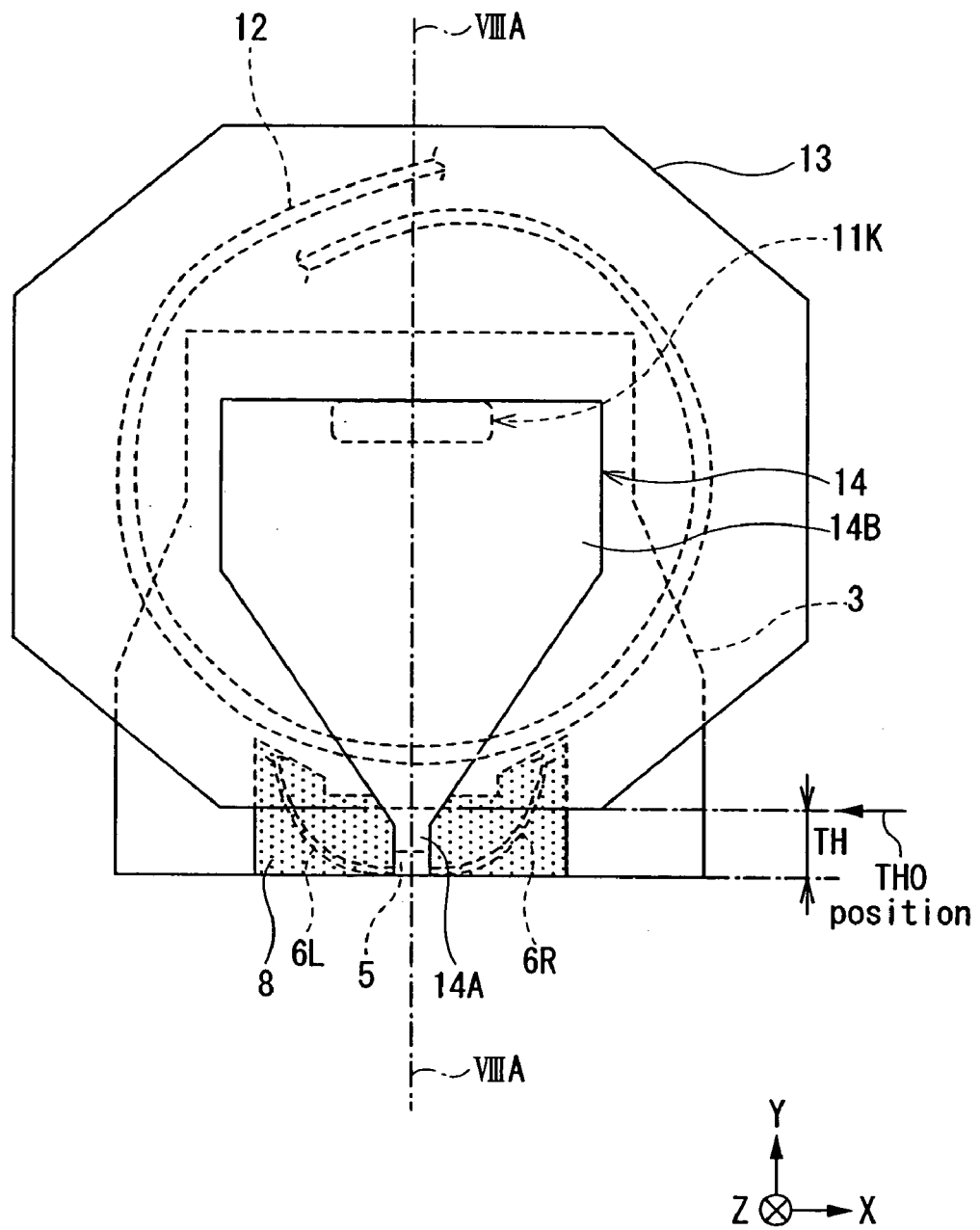
FIG. 15 is a plan view of a planar structure of a thin film magnetic head that is a modification to the thin film magnetic head according to the embodiment of the invention.

In the embodiment, the top shield layer 8 has a rectangular planar shape. However, the invention is not necessarily limited to the embodiment. The planar shape of the top shield layer 8 can be freely changed. Specifically, for example, the top shield layer 8 may have a planar shape shown in FIG. 15. In this case, a wider range of the lead layer 6 is coated with the top shield layer 8, as compared to the above-described embodiment (see FIG. 10). Therefore, the occurrence of a problem such as poor reading of information during reproducing can be more effectively prevented. In FIG. 15, the structure excluding the above-mentioned respect is the same as the structure shown in FIG. 10.

In the embodiment, plating is used to form the top shield layer 8. However, the invention is not necessarily limited to the embodiment. A method of forming the top shield layer 8 can be freely changed. Specifically, deposition and etching may be used to form the top shield layer 8 as shown in FIGS. 16A and 16B and FIGS. 17A and 17B, for example.

The top shield layer 8 is formed by use of the above-mentioned approach in the following manner. For example, after forming the shield gap film 7 (see FIGS. 1A and 1B), a preparatory magnetic layer 8P for serving as a preparatory layer for the top shield layer 8 is first formed over the overall surface by, for instance, sputtering or electroplating as shown in FIGS. 16A and 16B. For example, permalloy or the like is used as a material of the preparatory magnetic layer 8P. Then, a mask 61 made of, for example, a photoresist or the like is selectively formed on the preparatory magnetic layer 8P. Then, the overall surface is etched by, for example, ion milling using the mask 61, whereby the preparatory magnetic layer 8P is selectively patterned. Thus, the top shield layer 8 is selectively formed on the shield gap film 7 as shown in FIGS. 17A and 17B. By controlling etching conditions (an exterior etching angle and so on), the top shield layer 8 is formed so that the rearward end surface 8M of the top shield layer 8 may be inclined at the exterior angle θ2 of more than 90° with the surface 7M of the flat shield gap film 7, similarly to the above-described embodiment (see FIGS. 3A and 3B). After forming the top shield layer 8, the step of forming the insulating film 9 and the following steps are the same as the steps of the above-described embodiment shown in FIGS. 4A and 4B and the following drawings.

In the embodiment, the same material (permalloy) is used as the materials of the top shield layer 8 and the bottom pole 10. However, the invention is not necessarily limited to the embodiment. Different materials may be used. Specifically, for example, permalloy may be used as a material of the top shield layer 8, and a nickel-iron alloy or the like having a higher saturation magnetic flux density than permalloy may be used as a material of the bottom pole 10. A magnetic material having a higher saturation magnetic flux density is used as a material of the bottom pole 10 forming a part of the magnetic path, whereby the flow of magnetic flux through the magnetic path can be smoothed. Of course, a nickel-iron alloy may be used as a material of the top pole 14 forming the magnetic path similarly to the bottom pole 10.

Although the invention has been described above by referring to the embodiment, the invention is not limited to the above-mentioned embodiment and various modifications of the invention are possible. For example, the planar shape of a series of magnetic materials including the top pole 14 is not necessarily limited to the planar shape shown in FIG. 10 or 15. The planar shape of a series of magnetic materials can be freely changed as long as the functions of the magnetic materials can be ensured.

The method of forming a series of components constituting the thin film magnetic head and the materials of the components are not necessarily limited to the method and the materials described by referring to the above-mentioned embodiment. The method of forming a series of components and the materials of the components can be freely changed as long as the structural features and material features of the components can be reproduced.

As described above, according to the thin film magnetic head of the invention or the method of manufacturing a thin film magnetic head of the invention, the thin film coil is provided in the region farther from the recording-medium-facing surface than the second position by using as the reference position the second position farther from the recording-medium-facing surface than the first position. Thus, when it is assumed that the components formed between the step of forming the first magnetic film and the step of forming the thin film coil have the respective uniform thicknesses, the position of the surface of the underlayer of the region in which the thin film coil is to be formed is easily lower than the position of the surface of the underlayer of the region in which the first magnetic film is to be formed. This reduces the height of the apex portion formed of the insulating layer coating the thin film coil, thereby preventing an adverse influence of reflected light during exposure. Thus, a portion of the frame pattern having a local miniature width can be formed with high accuracy. Accordingly, a uniform-width portion of the two magnetic layers for determining the write track width can be formed with high accuracy, and therefore a pole width can be locally miniaturized with high accuracy.

When the length of the first magnetic film is equal to or less than ⅓ of the length of the insulating layer, a necessary and sufficient amount of magnetic flux can be ensured by increasing the winding number of the thin film coil, while the accuracy in forming the uniform-width portion being ensured excellently.

When the length of the first magnetic film is equal to or less than 10 μm, the propagation of magnetic flux through the magnetic path can be smoothed by reducing the length of the magnetic path and reducing the magnetic resistance in the magnetic path, while the above-mentioned accuracy in forming the uniform-width portion being ensured excellently.

When the end surface of the first magnetic film far from the recording-medium-facing surface is inclined at an exterior angle of more than 90° in the direction in which the first magnetic film extends, a magnetic flux can more smoothly propagate through the magnetic path, as compared to the case in which the above-mentioned end surface forms an angle of 90° in the direction in which the first magnetic film extends.

When the first magnetic film has a planar shape corresponding to the region in which the connect wiring is provided, magnetic noise is prevented from reaching to the connect wiring, and therefore the occurrence of a problem such as poor reading of information during reproducing can be prevented.

When one magnetic layer is made of a material having a higher saturation magnetic flux density than a saturation magnetic flux density of the material of the first magnetic film, the propagation of magnetic flux through the magnetic path can be smoothed.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a thin film magnetic head including: two magnetic layers magnetically coupled to each other and having two magnetic poles which face each other with a gap layer in between and face a recording medium, a thin film coil provided between the two magnetic layers, and an insulating layer for insulating the thin film coil from the two magnetic layers, including the steps of:
    forming a magnetic transducer film;
    forming a first magnetic film between the magnetic transducer film and the two magnetic layers so as to extend to a first position in a direction away from a recording-medium-facing surface facing the recording medium;
    forming the thin film coil in a region farther from the recording-medium-facing surface than a second position by using as a reference position the second position farther from the recording-medium-facing surface than the first position;
    etching a bottom one of the two magnetic poles with an other of the two magnetic poles as a mask so that at least a portion of the bottom one of the two magnetic poles and the other of the two magnetic poles have a substantially same width; and
    forming a second magnetic film opposite to the first magnetic film with the magnetic transducer film in between so as to extend from the recording-medium-facing surface to a third position farther from the recording-medium-facing surface than the second position, wherein the second magnetic film has a planar shape and provides a surface that is substantially flat over the overall surface of the second magnetic film.

2. A method of manufacturing a thin film magnetic head according to claim 1, wherein the first magnetic film is formed so as to have a length equal to or less than ⅓ of a length of the insulating layer.

3. A method of manufacturing a thin film magnetic head according to claim 1, wherein the first magnetic film is formed so as to have a length of 10 μm or less.

4. A method of manufacturing a thin film magnetic head according to claim 1, wherein the first magnetic film is formed so that an end surface of the first magnetic film far from the recording-medium-facing surface may be inclined so that an exterior angle between the end surface and a first magnetic film extending direction is more than 90°.

5. A method of manufacturing a thin film magnetic head according to claim 1, wherein the thin film coil is formed so that a position of a surface of the thin film coil close to the second magnetic film may be closer to the second magnetic film than a position of a surface of a portion of the gap layer near the recording-medium-facing surface, the surface being far from the second magnetic film.

6. A method of manufacturing a thin film magnetic head according to claim 1 further including the step of forming a connect wiring having one end connected to the magnetic transducer film and the other end connected to an external circuit, wherein the first magnetic film is formed so as to coat a region in which the connect wiring is provided.

7. A method of manufacturing a thin film magnetic head according to claim 1, wherein one of the two magnetic layers close to the first magnetic film is formed of a different material from a material of the first magnetic film.

8. A method of manufacturing a thin film magnetic head according to claim 7, wherein the one magnetic layer is formed of a material having a higher saturation magnetic flux density than a saturation magnetic flux density of the material of the first magnetic film.

9. A method of manufacturing a thin film magnetic head according to claim 1, wherein the step of forming the first magnetic film includes the steps of: forming a frame pattern for selectively forming a plated film pattern, using a negative photoresist; and forming the first magnetic film, that is the plated film pattern, using the frame pattern.

10. A method of manufacturing a thin film magnetic head according to claim 1, wherein the step of forming the first magnetic film includes the steps of: forming a preparatory magnetic layer for serving as a preparatory layer for the first magnetic film; and forming the first magnetic film by selectively etching the preparatory magnetic layer and thus patterning the preparatory magnetic layer.

* * * * *